April 13, 1926.
A. STOKOWSKI
1,580,865
DEVICE FOR PLACING BELTS ON PULLEYS
Filed Sept. 15, 1924
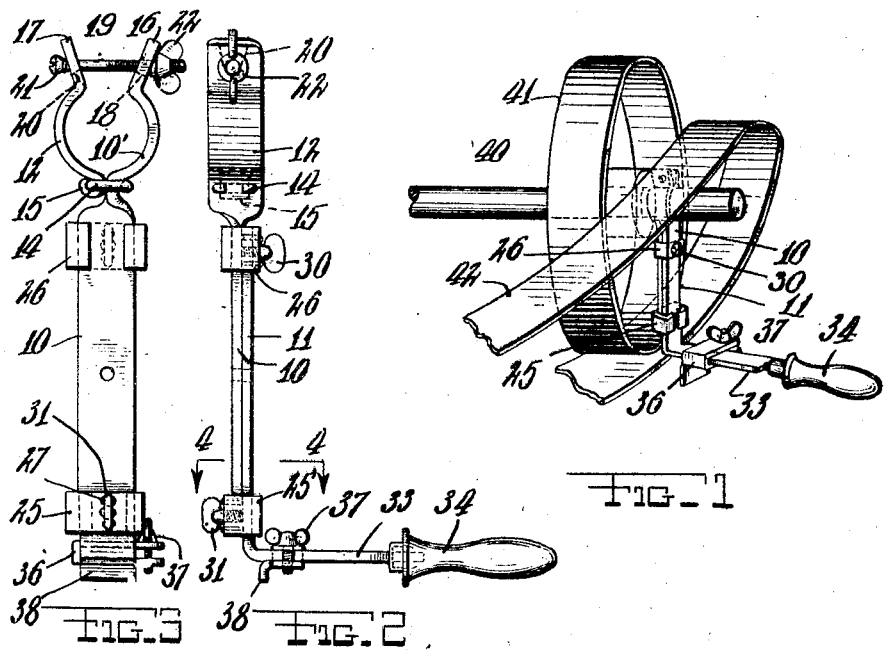
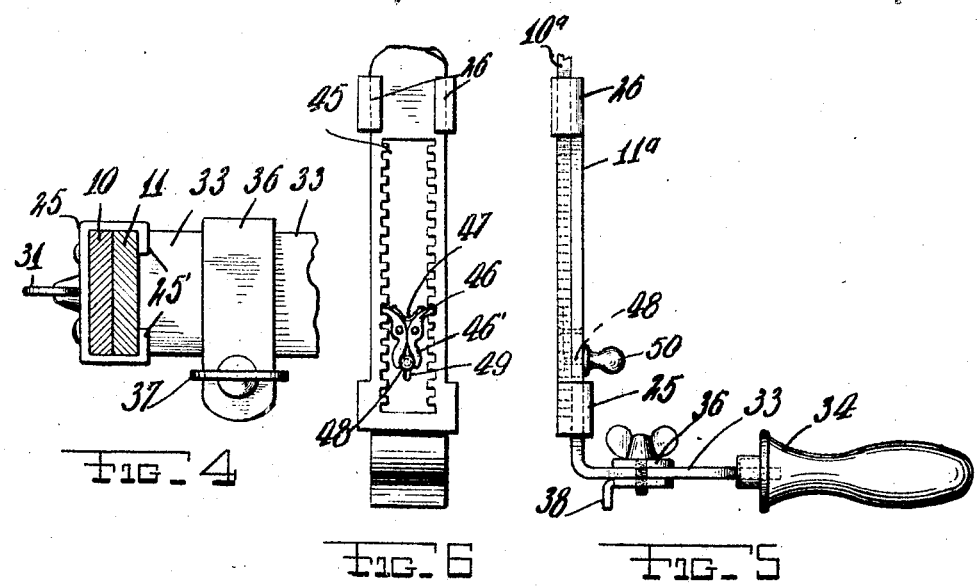
INVENTOR
Andrew Stokowski
BY
ATTORNEY Patented Apr. 13, 1926.

1,580,865

UNITED STATES PATENT OFFICE.

ANDREW STOKOWSKI, OF MILLTOWN, NEW JERSEY.

DEVICE FOR PLACING BELTS ON PULLEYS.

Application filed September 15, 1924. Serial No. 737,647.

*To all whom it may concern:*

Be it known that I, ANDREW STOKOWSKI, citizen of Poland, residing at Milltown, in the county of Middlesex and State of New Jersey, have invented certain new and useful Improvements in Devices for Placing Belts on Pulleys, of which the following is a specification.

This invention relates to a device for use in placing belts on pulleys, the invention having for an object the provision of a simple means whereby the placing of a belt over a pulley may be facilitated, and by the use of which danger of injury to the hands of the person applying the belt is eliminated.

For further comprehension of the invention, and of the objects and advantages thereof, reference will be had to the following description and accompanying drawing, and to the appended claims in which the various novel features of the invention are more particularly set forth.

Fig. 1 of the drawing is a perspective view showing my improved device as in use in applying a belt to a pulley.

Fig. 2 is a side view of the device alone.

Fig. 3 is an edge view thereof.

Fig. 4 is a transverse sectional view taken on the line 4—4 of Fig. 2.

Figs. 5 and 6 are fragmentary side and edge views showing a slightly modified construction.

As here embodied my improved device comprises two flat bars 10 and 11 which are placed face to face and arranged for a longitudinal adjustment on one another. At one end the bar 10 is given a quarter twist and curved to provide one-half or section 10′ of a split collar, the other half whereof is formed by a shorter bar or strap 12 that is complementarily curved and is pivotally attached at one end to the bar element 10′, this pivotal attachment being effected by a wire or rod 14 that is passed through an eye 15 formed on the strap 12 and through suitable apertures in the member 10′ and has its ends bent across the face of the latter. The parts 12 and 10′ are formed with straight end elements 16 and 17 the former of which is formed with an aperture 18 to receive a fastening bolt 19, while the latter has a notch 20 entered thereinto to accommodate the said bolt, the bolt having an enlarged head 21 that bears on the part 17, and has threaded thereon a nut 22 that bears on the part 16.

To secure the bars 10 and 11 to one another in longitudinally adjusted positions short transverse straps 25 and 26 are riveted between their ends as at 27 to the respective bars at the opposed or remote ends of the latter, these straps being bent at their ends to straddle each the other bar, that is to say each strap straddles the bar to which it is not fixed, as shown at 25′ and 26′ thereby holding the bars in slidable relation to one another, while preventing transverse displacement thereof. Set screws 30 and 31 are threaded through the respective straps and the bars to which they are fixed and bear each on the other bar, to rigidly secure the said bars in longitudinally adjusted positions with relation to one another.

The bar 11 is formed with a transverse extension 33 at the end thereof remote from the above mentioned split collar, this member 33 having a grip member or handle 34 fixed on its end. The member 33 has positioned thereon for longitudinal adjustment, a device presenting a lip that is adapted to engage the edge of the belt to be placed on the pulley. This device is in the form of a U-strap 36 that straddles the member 33 and extends transversely thereof. The ends of the said strap 36 project beyond the side of the member 33 and have a clamping screw 37 passed therethrough whereby the strap may be fixed on the said member 33. This strap 36 is formed, on the leg thereof which straddles the outer face of the member 33, with an outturned lip 38 that is adapted to engage the belt.

In the use of my improved belt applying device, the latter is positioned as shown in Fig. 1 of the drawing, with the split collar encircling freely the shaft 40 on which the pulley 41 is mounted. The transverse end element 33 is then engaged under the belt, the device being adjusted to bring said end element substantially flush with the rim of the pulley, and by swinging the device around the pulley shaft the belt, indicated at 42, is slipped upon the pulley.

In Figs. 5 and 6 I have shown a modified construction designed to facilitate longitudinal adjustment of the device to suit pulleys of various diameters. As here shown the bar 10ª, corresponding to the bar 10, is formed with a longitudinal slot 45 having square teeth along the opposite edges thereof, while the bar 11ª has pivoted thereon a pair of pawls 46 that are pressed against said teeth by the spring 47. These pawls may be moved out of engagement with the said teeth by means of a pin 48 that passes through a short longitudinal slot 49 in the bar 11ª and engages between the inclined tail-pieces 46' of the pawls, this pin being formed with a projecting knob 50 for purposes of manipulation. The parts are otherwise as above described, except that the screws 30 and 31 are omitted.

Having thus described my invention, what I claim as new and desire to protect by Letters Patent of the United States is as follows:—

1. A device for placing belts on pulleys comprising a pair of bars, one of said bars being formed to present a split collar on one end thereof, the other of said bars having a transverse offset at the end thereof remote from said collar, a lip element adjustable along said offset, a transverse strap rigidly fastened to each of said bars and holding the other of said bars respectively permitting longitudinal adjustment on one another, and means for securing said bars to one another in longitudinally adjusted positions, substantially as set forth.

2. A device for placing belts on pulleys comprising a pair of bars engaged with one another for longitudinal adjustment on one another, one of said bars being formed to present a split collar on one end thereof, the other of said bars having a transverse offset at the end thereof remote from said collar, and a lip element adjustable along said offset, and means for securing said bars to one another in longitudinally adjusted positions comprising a pair of spring pressed pawls carried by one bar and engaging ratchet teeth on the other bar, said pawls having inclined tailpieces, and a pin slidably carried by said first bar and adapted to engage between said tailpieces to move the pawls out of engagement with said ratchet teeth.

In testimony whereof I have affixed my signature.

ANDREW STOKOWSKI.